(12) United States Patent
Ebitani (10) Patent No.: US 9,781,281 B2
(45) Date of Patent: Oct. 3, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Kenji Ebitani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/607,379

(22) Filed: Jan. 28, 2015

(65) Prior Publication Data

US 2016/0219171 A1 Jul. 28, 2016

(30) Foreign Application Priority Data

Aug. 25, 2014 (JP) .................................. 2014-170341

(51) Int. Cl.
H04N 1/00 (2006.01)

(52) U.S. Cl.
CPC ..... *H04N 1/00474* (2013.01); *H04N 1/00482* (2013.01); *H04N 1/00503* (2013.01); *H04N 2201/0094* (2013.01)

(58) Field of Classification Search
CPC ....... H04N 2201/0094; H04N 1/00482; H04N 1/00503; H04N 1/00474
See application file for complete search history.

(56) References Cited

U.S. PATENT DOCUMENTS

| | | | |
|---|---|---|---|
| 6,421,509 B1* | 7/2002 | Nomura | H04N 1/00384 399/81 |
| 2012/0099130 A1* | 4/2012 | Tohki | G03G 15/502 358/1.13 |
| 2015/0222787 A1* | 8/2015 | Sakiyama | G06K 15/1806 358/3.28 |
| 2015/0244885 A1* | 8/2015 | Koike | H04N 1/00477 358/1.9 |

FOREIGN PATENT DOCUMENTS

JP 2001-154773 A 6/2001
JP 2003-223079 A 8/2003

* cited by examiner

*Primary Examiner* — Iriana Cruz
(74) *Attorney, Agent, or Firm* — Sughrue Mion, PLLC (57) ABSTRACT

An information processing apparatus includes a display unit, a changing unit, an image display unit, and an update unit. The display unit displays a first display area and a second display area. The second display area is an area in which a display element representing a function is disposed. The changing unit changes a setting value of the function to a different setting value in accordance with a received instruction to change a setting. When the setting value of the function is changed, the image display unit displays an image representing the function whose setting value is changed, in the first display area. While the image in the first display area remains to be displayed, the update unit changes the display of the second display area in which information about the function is displayed, in response to a received instruction to update the display.

21 Claims, 7 Drawing Sheets

| FUNCTION GROUP | FUNCTION | SETTING VALUE | CURRENT SETTING VALUE | INITIAL VALUE | IDENTIFICATION IMAGE |
|---|---|---|---|---|---|
| SETTING A | COPIES | 1 | ✔ | ✔ | — |
| | | 2 | | | — |
| | | ... | | | |
| | COLOR MODE | AUTOMATIC | | ✔ | — |
| | | COLOR | ✔ | | IMAGE A |
| | | BLACK & WHITE | | | IMAGE B |
| | SCALING | AUTOMATIC | ✔ | ✔ | — |
| | | 100% | | | IMAGE C |
| | | ... | | | |
| | DOUBLE-SIDED | OFF | | ✔ | — |
| | | LONG-EDGE BINDING | ✔ | | IMAGE D |
| | | SHORT-EDGE BINDING | | | IMAGE E |
| | MULTIPLE-UP | OFF | | ✔ | — |
| | | 2-UP | | | IMAGE F |
| | | 4-UP | ✔ | | IMAGE G |
| | | 8-UP | | | IMAGE H |
| | | 16-UP | | | IMAGE I |
| | ... | | | | |
| SETTING B | PUNCHING | OFF | | ✔ | — |
| | | ON | ✔ | | IMAGE J |
| | STAPLING | OFF | | ✔ | — |
| | | ON | ✔ | | IMAGE K |
| | ... | | | | |
| ... | | | | | |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-170341 filed Aug. 25, 2014.

BACKGROUND (i) Technical Field

The present invention relates to an information processing apparatus, an information processing method, and a non-transitory computer readable medium, particularly to a technique for displaying information about functions and their setting values.

(ii) Related Art

In image forming apparatuses, such as a facsimile, a printer, and a multi-function device, setting values of functions, such as the number of copies and scaling, are displayed on a setting screen so as to be presented to a user. At the same time, an input operation is received from the user in the state in which the setting screen is displayed, and a setting value is changed from its original setting value.

SUMMARY

According to an aspect of the invention, there is provided an information processing apparatus including a display unit, a changing unit, an image display unit, and an update unit. The display unit displays a first display area and a second display area. The second display area is an area in which a display element representing a function is disposed. The changing unit changes a setting value of the function to a different setting value in accordance with a received instruction to change a setting. When the setting value of the function is changed, the image display unit displays an image representing the function whose setting value is changed, in the first display area. While the image in the first display area remains to be displayed, the update unit changes the display of the second display area in which information about the function is displayed, in response to a received instruction to update the display.

BRIEF DESCRIPTION OF THE DRAWINGS

Exemplary embodiments of the present invention will be described in detail based on the following figures, wherein.

DETAILED DESCRIPTION

An exemplary embodiment for carrying out the present invention (hereinafter referred to as an exemplary embodiment) will be described below with reference to the drawings. In the drawings of the specification, components similar to those in an already-mentioned drawing are designated with identical reference numbers, and no detailed description may be made as appropriate.

1. Hardware Configuration

Figure 1:
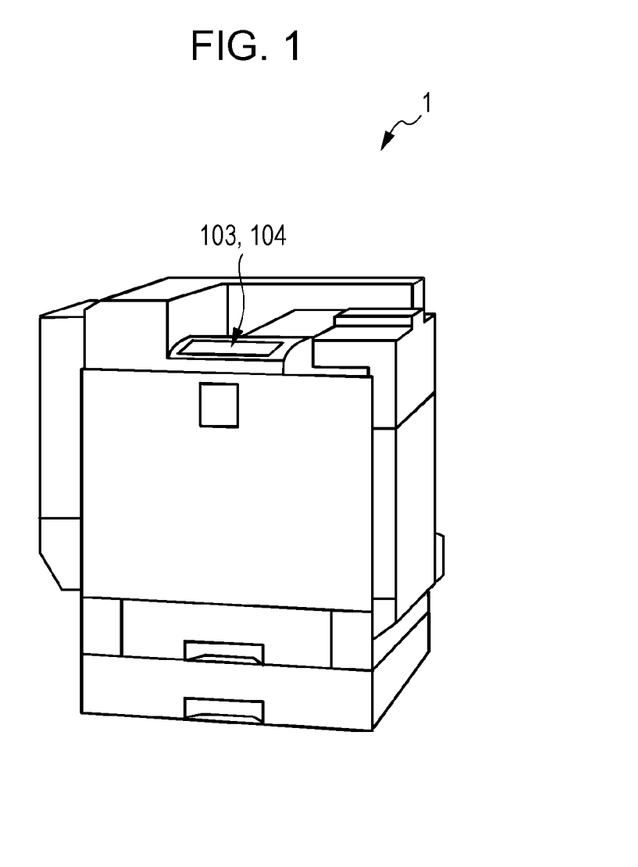
FIG. 1 is a diagram illustrating an exemplary information processing apparatus.

FIG. 1 is a diagram illustrating the appearance of an information processing apparatus according to the exemplary embodiment. An information processing apparatus 1 which is, for example, a printer used by users includes a controller (not illustrated) such as a microprocessor, a storage unit (not illustrated), such as a random-access memory (RAM) or a hard disk drive, a display unit 103 such as a display, and an input unit 104, such as an input button for receiving a user input or a touch panel overlying the display unit 103.

2. Function Setting Screen

Display on the display unit 103 of the information processing apparatus 1 according to the exemplary embodiment will be described below on the basis of exemplary function setting screens illustrated in FIGS. 2 to 5.

Figure 2:
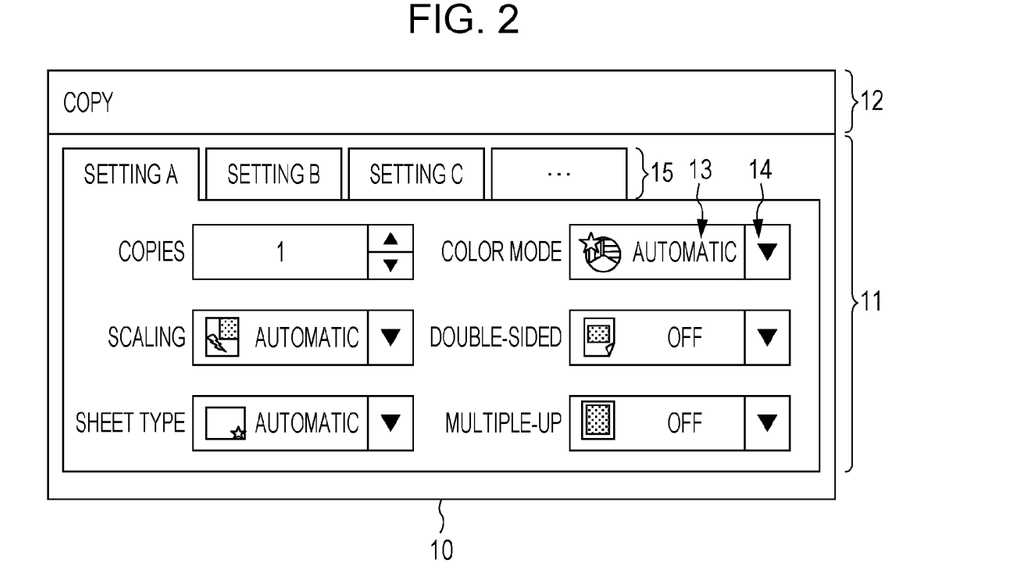
FIG. 2 is a diagram illustrating an exemplary function setting screen.

FIGS. 2 to 5 illustrate exemplary function setting screens displayed on the display unit 103 of the information processing apparatus 1 according to the exemplary embodiment. As illustrated in FIG. 2, a display change area 11 in which the display is changed in response to an operation which is performed on a tab 15 and which indicates an instruction to change the display, and a semi-fixed display area 12 in which a part of the display remains the same even when an operation indicating an instruction to change the display is performed on a tab 15 are displayed on a function setting screen 10 displayed on the display unit 103. In the display change area 11, for example, display elements 13 representing current setting values, and setting changing buttons 14 for displaying a screen (for example, a drop-down list in which a list of settable values for a function is displayed) for changing a setting value are displayed for functions (for example, options) provided for the information processing apparatus 1.

On the function setting screen 10 illustrated in FIG. 2, setting values of some functions among the functions provided for the information processing apparatus 1 are displayed. More specifically, setting values of functions, such as "copies", "color mode", and "scaling", belonging to a function group "setting A" are displayed.

Figure 3:
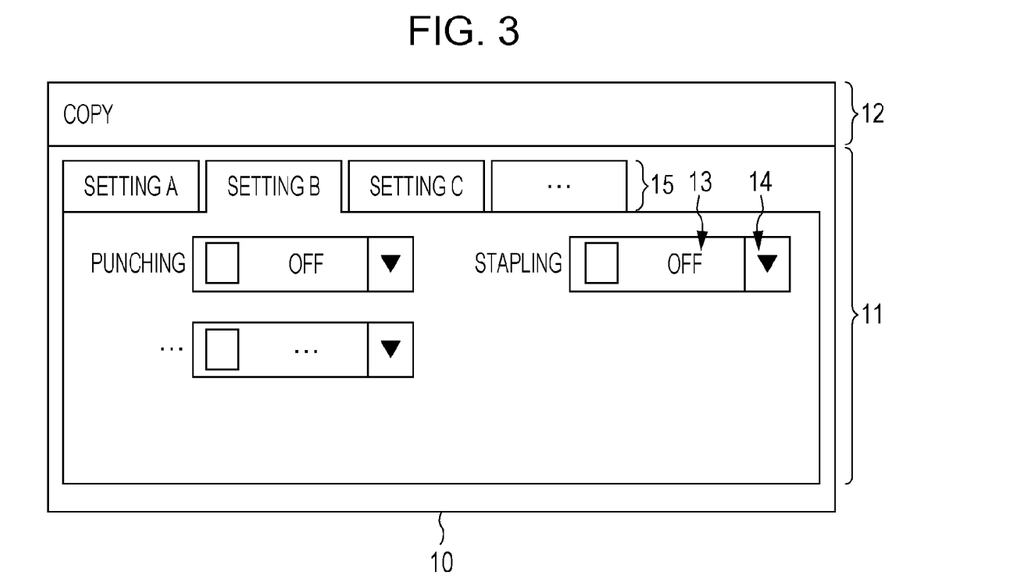
FIG. 3 is a diagram illustrating an exemplary function setting screen.

When an operation indicating an instruction to change the display (such as a touch operation at the display position of a tab 15 on the touch panel) is performed on a tab 15, functions other than those belonging to "setting A" are displayed. For example, when an operation indicating an instruction to change the display is performed on a tab 15 representing a function group "setting B", the function setting screen 10 illustrated in FIG. 3 is displayed. As illustrated in FIG. 3, the setting values of functions, such as "punching" and "stapling", belonging to "setting B" are displayed on the function setting screen 10. In this state, when an operation indicating an instruction to change the display is performed on the tab 15 representing "setting A", the function setting screen 10 illustrated in FIG. 2 is displayed again on the display unit 103.

FIGS. 2 and 3 illustrate examples obtained when the predetermined initial values are set as the current setting values of various functions. The initial values of various functions are stored in advance in the storage unit of the information processing apparatus 1.

Figure 4:
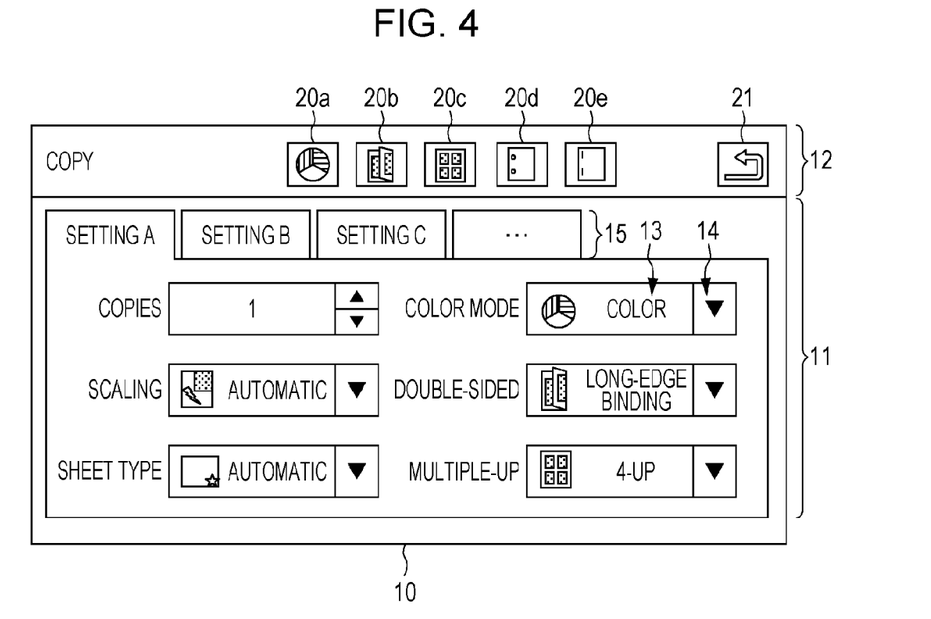
FIG. 4 is a diagram illustrating an exemplary function setting screen.

FIG. 4 illustrates an example obtained when setting values different from the initial values are set to some functions provided for the information processing apparatus 1. As illustrated in FIG. 4, identification images 20a, 20b, 20c, 20d, and 20e (hereinafter may be referred to as identification images 20 collectively) and an initialization image 21 are displayed in the semi-fixed display area 12 on the function setting screen 10. The identification images 20 represent functions whose setting values are changed from the initial values or the changed setting values, and the initialization image 21 is used to change the changed setting values to the initial values. Even when an operation indicating an instruction to change the display is performed on a tab 15, the display of the identification images 20 and the initialization image 21 in the semi-fixed display area 12 remains the same. Therefore, a user may easily check functions and their setting values which are changed from the initial values, compared with the case in which the display of the identification images 20 and the initialization image 21 in the semi-fixed display area 12 does not remain the same.

For example, in FIG. 4, the setting value of the function "punching" belonging to "setting B" is changed from the initial value "off" to "on". Therefore, in the semi-fixed display area 12, the identification image 20d representing the function "punching" is displayed. Similarly, the setting value of the function "stapling" is also changed from the initial value "off" to "on". Therefore, in the semi-fixed display area 12, the identification image 20e representing the function "stapling" is displayed. Thus, even when a function belonging to "setting B" is not displayed in the display change area 11, the identification images 20d and 20e are displayed in the semi-fixed display area 12, whereby a user may easily determine that the functions "punching" and "stapling" which belong to "setting B" are changed from the initial values, compared with the case in which no identification images representing functions whose setting values are changed from the initial values are displayed in the semi-fixed display area 12 on the function setting screen 10.

For example, in FIG. 4, the identification image 20a indicating that the setting value of the function "color mode" is "color", the identification image 20b indicating that the setting value of the function "double-sided" is "long-edge binding", and the identification image 20c indicating that the setting value for the function "multiple-up" is "4-up" are displayed. Therefore, even if no functions belonging to "setting A" are displayed in the display change area 11, a user may easily check setting values changed from the initial values of the functions belonging to "setting A", compared with the case in which no identification images representing setting values of functions changed from the initial values are displayed in the semi-fixed display area 12 on the function setting screen 10.

In the information processing apparatus 1 according to the exemplary embodiment, a user performs an operation indicating an instruction to change the setting, on an identification image 20, whereby the setting value of the function may be changed.

Figure 5:
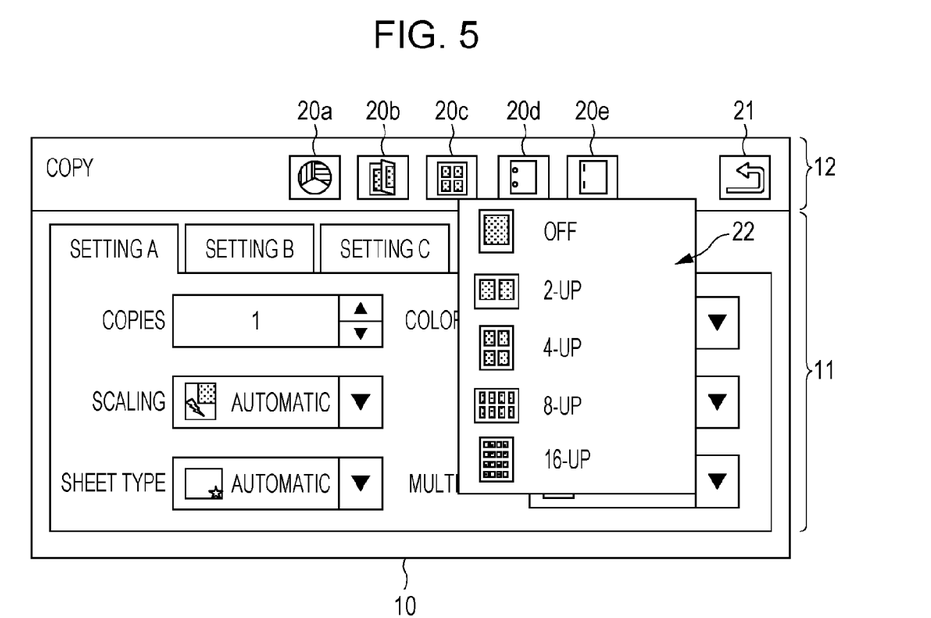
FIG. 5 is a diagram illustrating an exemplary function setting screen.

FIG. 5 illustrates an example obtained when settable values for a function are displayed in response to an operation which is performed on an identification image 20 and which indicates an instruction to change the setting (such as a touch operation at the display position of the identification image 20 on the touch panel). As illustrated in FIG. 5, when an input operation is performed on an identification image 20, a function selecting area 22 in which a list of settable values for the function for the identification image 20 is displayed on the function setting screen 10. An input operation of selecting any from the list of setting values displayed in the function selecting area 22 causes the setting value of the function to be changed to the selected setting value.

Thus, when the setting value of the function is changed to a different one, the identification image 20 is changed to one representing the changed setting value. For example, for the function "multiple-up", when the original setting value "4-up" is changed to "2 pages", the identification image 20c indicating that the function is set to "4-up" is changed to an image indicating that the function is set to "2 pages".

In the function selecting area 22, an element indicating the initial value stored in advance for the function is also displayed. A user performs an input operation of selecting this element, whereby the setting value of the function for the identification image 20 is changed to the initial value. When the setting value of the function is changed to the initial value, the identification image 20 which has been displayed disappears. For example, when a user changes the setting value of the function "multiple-up" to the initial value "off", the identification image 20c is not displayed on the function setting screen 10.

In the information processing apparatus 1 according to the exemplary embodiment, a user performs an operation indicating an instruction to change the settings, on the initialization image 21, whereby the setting values of all of the functions which have been changed from the initial values are changed to the respective initial values. At that time, the initialization image 21 and all of the identification images 20 are not displayed on the function setting screens 10. That is, the identification images 20 and the initialization image 21 are displayed when the setting values are set at values different from the initial values.

3. Functional Blocks

Functions of the information processing apparatus 1 which are used to display the function setting screens 10 in FIGS. 2 to 5 will be described in detail.

Figure 6:
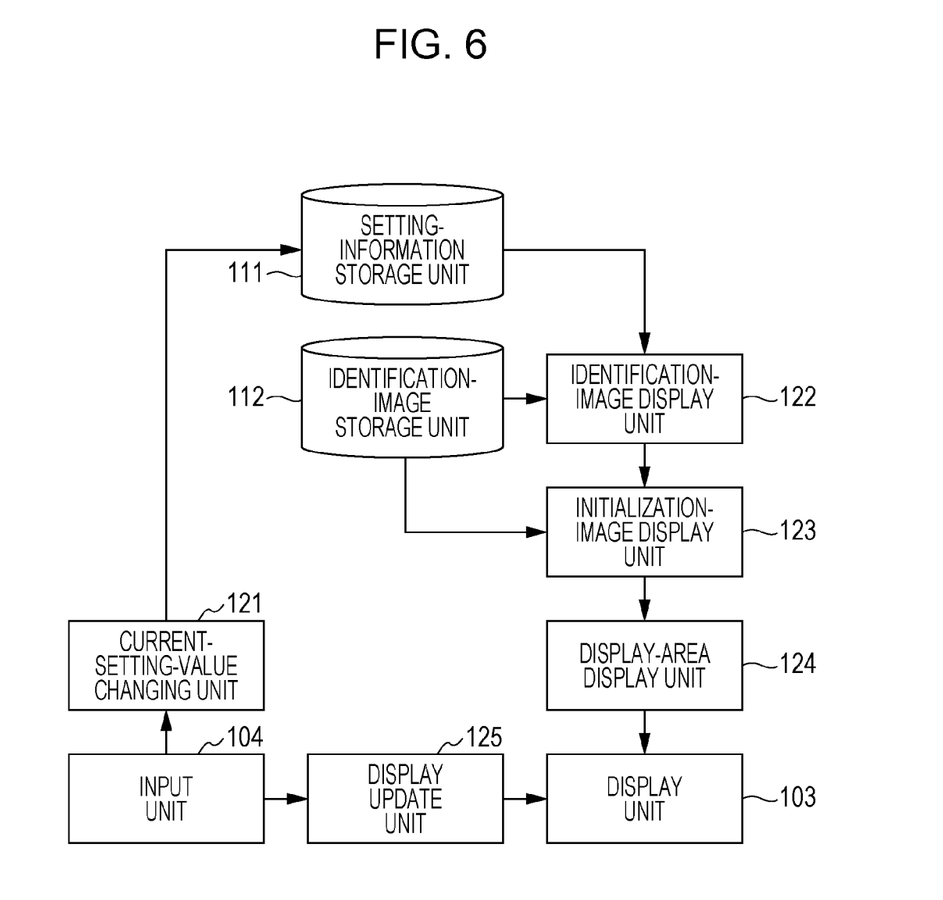
FIG. 6 is a block diagram illustrating an exemplary functional configuration of the information processing apparatus.

FIG. 6 is a block diagram illustrating an exemplary functional configuration of the information processing apparatus 1. As illustrated in FIG. 6, the information processing apparatus 1 functionally includes a setting-information storage unit 111, an identification-image storage unit 112, a current-setting-value changing unit 121, an identification-image display unit 122, an initialization-image display unit 123, a display-area display unit 124, and a display update unit 125. These functions are achieved with the controller of the information processing apparatus 1 executing programs stored in the storage unit of the information processing apparatus 1. These programs may be provided for the information processing apparatus 1 by downloading the programs from other apparatuses via a communication network, or may be provided through a computer-readable information recording medium, such as an optical disk or a Universal Serial Bus (USB) memory.

3-1. Setting-Information Storage Unit

The setting-information storage unit 111 stores setting information representing current setting values and the initial values of the functions provided for the information processing apparatus 1. The setting-information storage unit 111 may be achieved in such a manner as to include the storage unit of the information processing apparatus 1.

Figure 7:
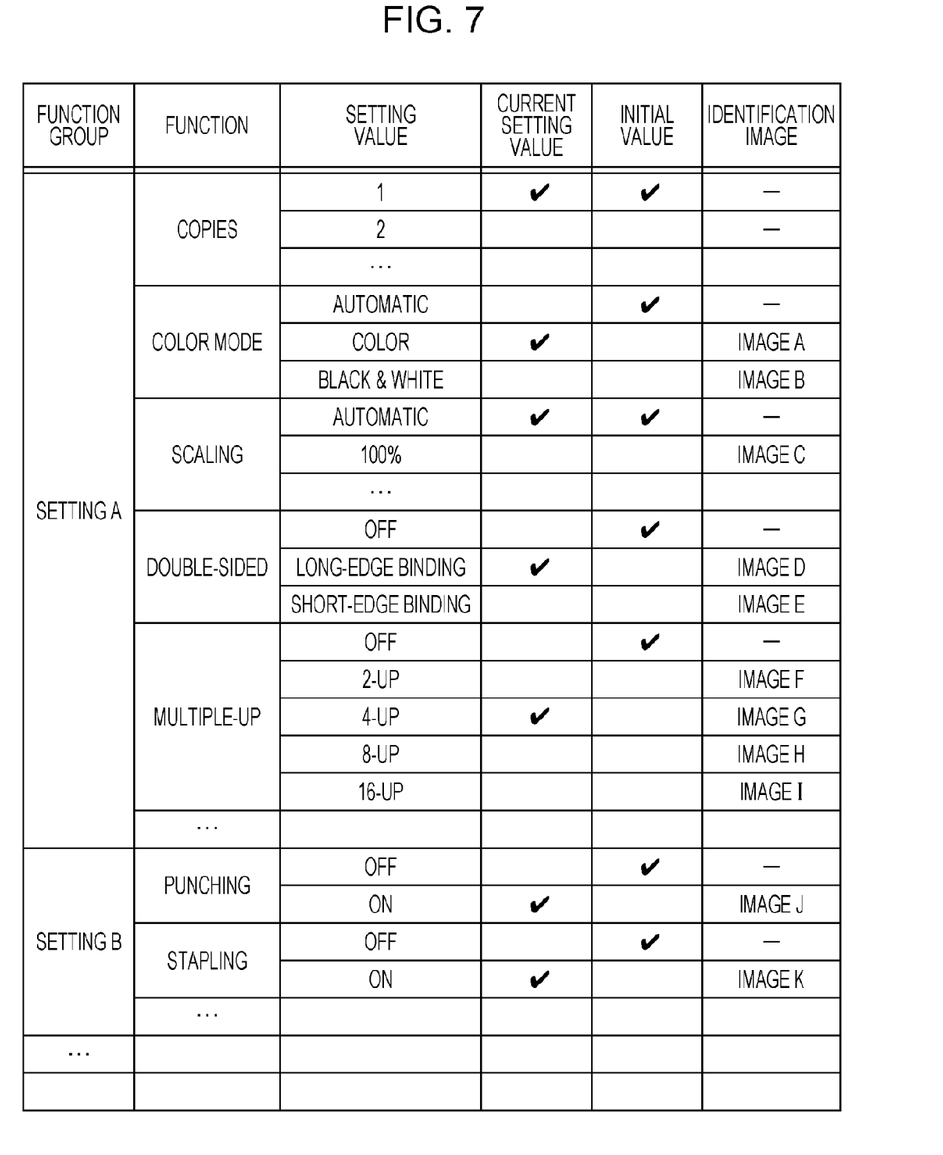
FIG. 7 is a diagram illustrating exemplary setting information.

FIG. 7 is a diagram illustrating exemplary setting information stored in the setting-information storage unit 111. As illustrated in FIG. 7, the setting information includes setting values which are settable for various functions, such as "copies" and "color mode", information representing the current setting values, information representing the initial values, and information (such as file names) for specifying identification images 20 stored in the identification-image storage unit 112 (described below).

3-2. Identification-Image Storage Unit

The identification-image storage unit 112 stores identification images 20 representing the functions provided for the information processing apparatus 1 or the setting values of the functions. The identification-image storage unit 112 may be achieved in such a manner as to include the storage unit of the information processing apparatus 1.

3-3. Current-Setting-Value Changing Unit

In response to an operation which is performed on a display element 13 representing a function displayed on the function setting screen 10, a setting changing button 14, or the like and which indicates an instruction to change the setting, the current-setting-value changing unit 121 changes the current setting value of the function to a different setting value. An instruction to change a setting is an instruction based on a detection result obtained by the input unit 104, such as an operation button or a touch panel, detecting an input operation from a user, and indicates a setting value desired by the user.

More specifically, the current-setting-value changing unit 121 changes the current setting value of the setting information stored in the setting-information storage unit 111 to a setting value indicated by the instruction to change a setting. For example, in the case where the setting information illustrated in FIG. 7 is stored, when the instruction to change a setting indicates that the setting value of the function "color mode" be changed to "black & white", the current-setting-value changing unit 121 changes the current setting value of the function "color mode" from "color" to "black & white".

In response to an operation which is performed on an identification image 20 and which indicates an instruction to change the setting, the current-setting-value changing unit 121 changes the setting value of the function for the identification image 20 to a different setting value. For example, the current-setting-value changing unit 121 changes the setting value of the function for an identification image 20 to a setting value selected by a user from setting values displayed in the function selecting area 22 (see FIG. 5).

In response to an operation which is performed on the initialization image 21 and which indicates an instruction to initialize the settings, the current-setting-value changing unit 121 changes the setting values of functions changed from the initial values to the initial values. For example, in the case where the setting information illustrated in FIG. 7 is stored, when an input operation is performed on the initialization image 21, the current-setting-value changing unit 121 changes the current setting values of the functions "color mode", "double-sided", "multiple-up", "punching", and "stapling" to the initial values "automatic", "off", "1 page", "off", and "off", respectively.

3-4. Identification-Image Display Unit

When the setting value of a function is changed from the predetermined initial value, the identification-image display unit 122 causes an identification image 20 representing the function or the changed setting value to be displayed in the semi-fixed display area 12 on the function setting screen 10. When the setting value of a function is changed to the predetermined initial value, the identification-image display unit 122 exerts control so that the identification image 20 for the function is not displayed in the semi-fixed display area 12.

More specifically, the identification-image display unit 122 refers to the setting information stored in the setting-information storage unit 111. When the current setting value of a function is different from the initial value, the identification image 20 for the function is displayed in the semi-fixed display area 12. For example, when the setting information illustrated in FIG. 7 is stored, the identification-image display unit 122 causes an identification image 20 of "image A" indicating that the function "color mode" whose current setting value is different from the initial value is set to the setting value "color" to be displayed. Similarly, the identification-image display unit 122 causes an identification image 20 of "image D" indicating that the function "double-sided" is set to a setting value of "long-edge binding", an identification image 20 of "image G" indicating that the function "multiple-up" is set to a setting value of "4-up", an identification image 20 of "image J" indicating that the function "punching" is changed from the initial value "off" to "on", and an identification image 20 of "image K" indicating that the function "stapling" is changed from the initial value "off" to "on" to be displayed.

In the case where no information for specifying an identification image 20 for a setting value is set in the setting information (for example, in the case where "-" is set to the information about an identification image in the setting information in FIG. 7), even when the current setting value of the function is different from the initial value, the identification-image display unit 122 may cause the identification image 20 representing the setting value not to be displayed.

3-5. Initialization-Image Display Unit

When the setting value of a function is changed from the predetermined initial value, the initialization-image display unit 123 causes the initialization image 21 to be displayed in the semi-fixed display area 12 on the function setting screen 10. When an operation indicating an instruction to change the settings is performed on the initialization image 21, the current-setting-value changing unit 121 changes the setting values of all of the functions to the initial values. Accordingly, identification images 20 and the initialization image 21 are not displayed in the semi-fixed display area 12 on the function setting screen 10.

3-6. Display-Area Display Unit

The display-area display unit 124 causes the function setting screen 10 including the semi-fixed display area 12 and the display change area 11 in which the display elements 13 representing some of functions provided for the information processing apparatus 1 are disposed, to be displayed on the display unit 103. When the identification-image display unit 122 and the initialization-image display unit 123 cause identification images 20 and the initialization image 21 to be displayed, the display-area display unit 124 causes the function setting screen 10 including the identification images 20 and the initialization image 21 to be displayed.

3-7. Display Update Unit

While keeping the display of the identification images 20 and the initialization image 21 in the semi-fixed display area 12, the display update unit 125 changes information about functions displayed in the display change area 11 in response to a received instruction to change the display. For example, when an operation indicating an instruction to change the display is performed on the tab 15 of "setting B", the display update unit 125 changes information about functions displayed in the display change area 11 from the functions belonging to "setting A" to the functions belonging to "setting B".

When the setting value of a function has been changed from the initial value, the identification image 20 for the function remains to be displayed in the semi-fixed display area 12. Therefore, if the display element 13 representing the setting value of the function is not displayed in the display change area 11, a user may easily check the function whose setting value is changed from the initial value or the setting value of the function, compared with the case in which the identification image 20 remains not to be displayed in the semi-fixed display area 12 when the display element 13 representing the setting value of the function is not displayed in the display change area 11.

4. Modified Exemplary Embodiments

The exemplary embodiment which is an example of the present invention is described. However, the present invention is not limited to the above-described exemplary embodiment. Other exemplary embodiments (modified exemplary embodiments) for carrying out the present invention will be described.

(1) In the exemplary embodiment, the case in which the information processing apparatus 1 is a printer is described. The information processing apparatus 1 may be any apparatus as long as it includes the controller, the storage unit, the display unit 103, and the input unit 104, and may be, for example, a cellular phone such as a smartphone, a tablet terminal, or a personal computer.

(2) In the exemplary embodiment, the case in which the display-area display unit 124 of the information processing apparatus 1 causes the function setting screen 10 including the semi-fixed display area 12 and the display change area 11 which is at least a part of an area in which display elements 13 representing the setting values of functions are disposed, to be displayed on the display unit 103 is described. The semi-fixed display area 12 does not need to be displayed while identification images 20 and the initialization image 21 are not displayed.

The display-area display unit 124 according to the modified exemplary embodiment exerts control so that the semi-fixed display area 12 is displayed when the identification-image display unit 122 causes an identification image 20 to be displayed, and exerts control so that the semi-fixed display area 12 is not displayed when no identification images 20 are displayed. Thus, when all of the setting values are set to the initial values, the display space for the semi-fixed display area 12 on the function setting screen 10 is saved, and the display space for the display change area 11 is wider than that in the case in which the semi-fixed display area 12 is displayed all the time.

(3) In the case where a large number of functions are changed from the initial values and where a large number of identification images 20 are displayed, when the size of the semi-fixed display area 12 is not changed, not all of the identification images 20 may be included in the semi-fixed display area 12. Therefore, the display-area display unit 124 may cause the semi-fixed display area 12 having a different size to be displayed in accordance with the number of identification images 20 displayed by the identification-image display unit 122. Thus, the display-area display unit 124 enables many identification images 20 to be displayed, compared with the case in which the semi-fixed display area 12 has a constant size.

(4) In the exemplary embodiment, the case in which, when the setting value of a function is changed from the initial value, the identification-image display unit 122 displays the function or an identification image 20 representing the changed setting value in the semi-fixed display area 12 on the function setting screen 10 is described. When the display element 13 representing the setting value of the function is displayed in the display change area 11, a user may check the changed setting value without the identification image 20 for the function being redundantly displayed.

Therefore, when the display element 13 representing the setting value of a function is displayed in the display change area 11, the identification-image display unit 122 according to the modified exemplary embodiment exerts control so that the identification image 20 for the function is not displayed in the semi-fixed display area 12.

Figure 8:
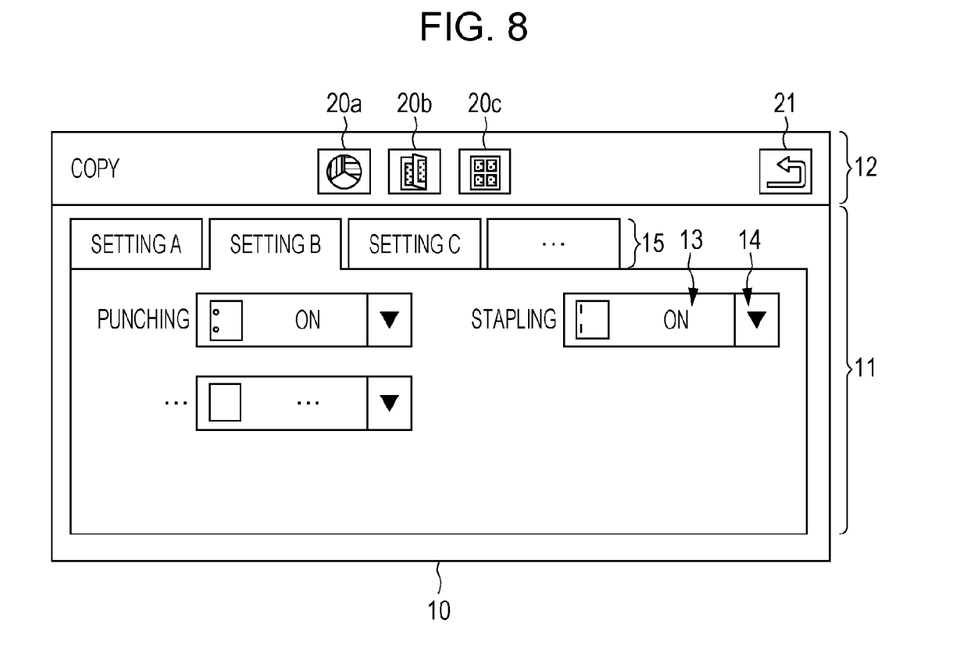
FIG. 8 is a diagram illustrating an exemplary function setting screen.

FIG. 8 is a diagram illustrating an exemplary function setting screen according to the modified exemplary embodiment. On the function setting screen 10 illustrated in FIG. 8, each of the current setting values of the functions "punching" and "stapling" provided for the information processing apparatus 1 is changed from the initial value "off" to "on". Control is exerted so that, while the display elements 13 representing the functions "punching" and "stapling" are displayed, the identification images 20 representing these functions are not displayed in the semi-fixed display area 12.

Thus, compared with the case in which the display of an identification image 20 representing the function corresponding to a displayed display element 13 is not omitted, the information processing apparatus 1 according to the modified exemplary embodiment enables a user to easily check a changed function or the setting value of the function while a minimum number of identification images 20 are displayed in the semi-fixed display area 12.

(5) In the exemplary embodiment, the case in which the display change area 11 in which the display is changed in accordance with an input operation performed on a tab 15 is displayed on the function setting screen 10 is described. For example, as in the function setting screen 10 illustrated in FIG. 9, an operation indicating an instruction to update the display is performed on a scroll bar 16 (for example, an input operation for moving the scroll bar in the vertical direction of the function setting screen 10 or an input operation for moving the function setting screen 10 in the vertical direction through a gesture or the like), whereby the display may be changed in the display change area 11. In this case, a group of display elements 13 displayed in the display change area 11 is changed in accordance with the position of the scroll bar. Depending on the position of the scroll bar, a display element 13 representing the setting value of a function may disappear.

Similarly to the modified exemplary embodiment (4), in the case where a display element 13 representing a function is displayed in the display change area 11, the identification-image display unit 122 may exert control so that the identification image 20 for the function is not displayed. For example, in the example in FIG. 9, the identification images 20 representing the functions "punching" and "stapling" displayed in the display change area 11 are not displayed in the semi-fixed display area 12.

Figure 9:
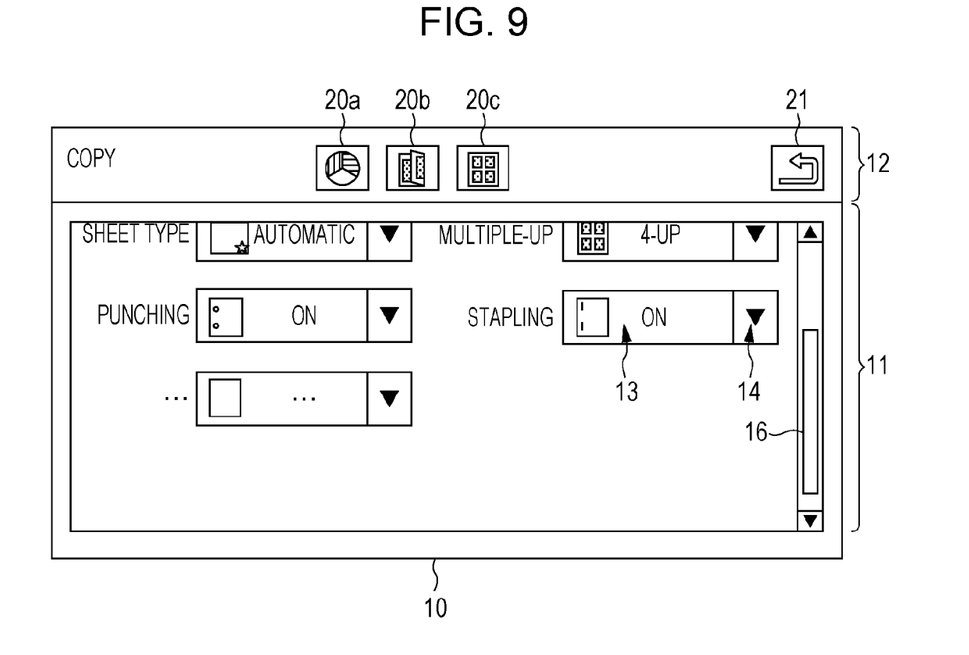
FIG. 9 is a diagram illustrating an exemplary function setting screen.

In the example in FIG. 9, when the entire display element 13 representing a function is displayed, the identification-image display unit 122 causes the identification image 20 for the function not to be displayed. Other than this, when a part of a display element 13 representing a function is displayed, the identification-image display unit 122 may cause the identification image 20 for the function not to be displayed. In the example in FIG. 9, the identification image 20c representing the setting value of the function "multiple-up" does not need to be displayed.

Figure 10:
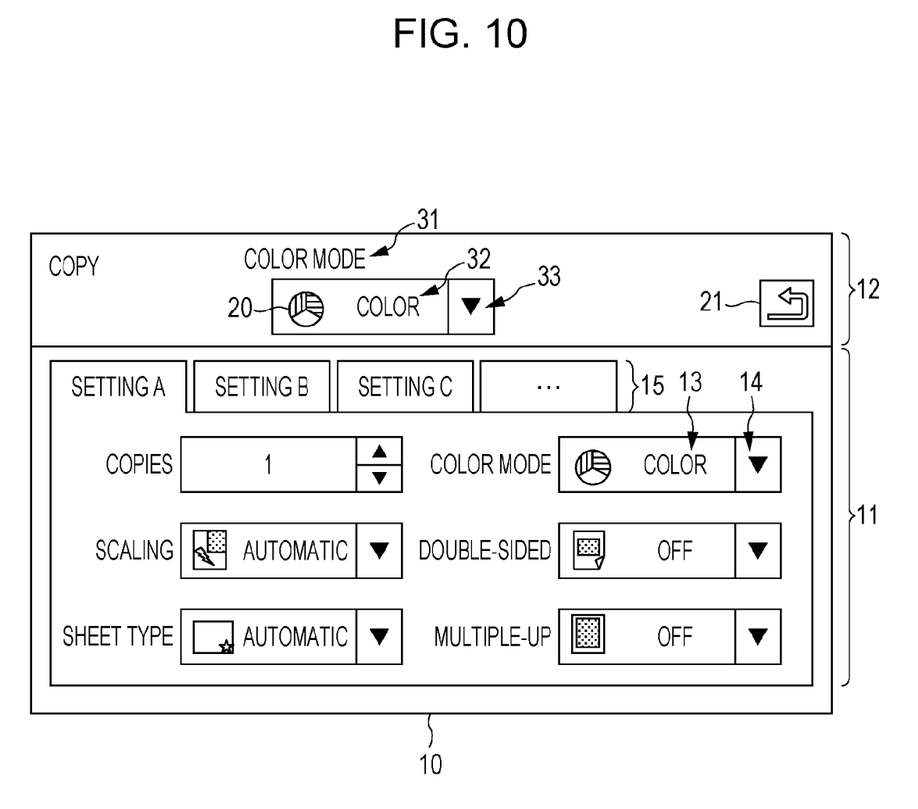
FIG. 10 is a diagram illustrating an exemplary function setting screen.

(6) As illustrated in FIG. 10, in the semi-fixed display area 12 on the function setting screen 10, for example, a function name 31 which is text information representing a function name, setting value information 32 which is text information about a setting value, and a setting changing button 33 may be displayed in addition to an identification image 20 representing a function whose setting value is changed from the initial value or the setting value of the function. An input operation performed on the setting value information 32 or the setting changing button 33 may cause the function selecting area 22 (see FIG. 5) in which a list of setting values settable for the function is displayed to be displayed, or may cause the setting value to be changed to a setting value selected from the list of the setting values for the function.

5. Points to be Checked

An image and a display element in the scope of claims correspond, for example, to an identification image 20 and a display element 13, respectively. A first display area and a second display area in the scope of claims correspond, for example, to the semi-fixed display area 12 and the display change area 11, respectively.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display configured to display a first display area and a second display area, the second display area being an area in which a display element representing a function is disposed; and
at least one processor which implements:
a changing unit configured to change a setting value of the function in the second display area to a different setting value in accordance with a received instruction to change a setting in the second display area;
an adding unit configured to add, in the first display area, a changed function image which indicates the difference from a default value changed in accordance with the received instruction in the second display area, wherein the default value is the setting value of the function which is preset in the information processing apparatus; and
an update unit that, while the changed function image which is added by the adding unit in the first display area remains displayed, is configured to change the display of the second display area in which information about the function is displayed, in response to receiving an instruction in the second display area to update the display of the second display area.

2. The information processing apparatus according to claim 1,
wherein the display is configured to display the first display area when the changed function image is displayed, and not to display the first display area when the changed function image is not displayed.

3. The information processing apparatus according to claim 1,
wherein the display is configured to display the first display area having a different size in accordance with the number of displayed changed function images.

4. The information processing apparatus according to claim 2,
wherein the display is configured to display the first display area having a different size in accordance with the number of displayed changed function images.

5. The information processing apparatus according to claim 1,
wherein the changing unit is configured to change the setting value of the function for the changed function image to a different setting value in accordance with the instruction to change a setting, the instruction being received through the changed function image.

6. The information processing apparatus according to claim 2,
wherein the changing unit is configured to change the setting value of the function for the changed function image to a different setting value in accordance with the instruction to change a setting, the instruction being received through the changed function image.

7. The information processing apparatus according to claim 3,
wherein the changing unit is configured to change the setting value of the function for the changed function image to a different setting value in accordance with the instruction to change a setting, the instruction being received through the changed function image.

8. The information processing apparatus according to claim 4,
wherein the changing unit is configured to change the setting value of the function for the changed function image to a different setting value in accordance with the instruction to change a setting, the instruction being received through the changed function image.

9. The information processing apparatus according to claim 1, further comprising:
an initialization-image display is configured to display an initialization image in the first display area when the setting value of the function is changed,
wherein the changing unit is configured to change the setting value of the function to an initial value in accordance with an instruction to initialize the setting value, the instruction being received through the initialization image.

10. The information processing apparatus according to claim 1,
wherein the adding unit is configured to exert control in such a manner that, in response to the setting value of the function being changed to an initial value, the changed function image representing the function is not displayed in the first display area.

11. The information processing apparatus according to claim 1,
wherein the adding unit is configured to exert control in such a manner that, in response to the display element representing the function being displayed by the display, the changed function image representing the function is not displayed in the first display area.

12. A non-transitory computer readable medium storing a program causing a computer to execute a process comprising:
displaying a first display area and a second display area, the second display area being an area in which a display element representing a function is disposed;
changing a setting value of the function in the second display area to a different setting value in accordance with a received instruction to change a setting in the second display area;
adding, in the first display area, a changed function image which indicates the difference from a default value changed in accordance with the received instruction in the second display area, wherein the default value is the setting value of the function which is preset in the information processing apparatus; and
while the changed function image which is added in the first display area remains to be displayed, changing the display of the second display area in which information about the function is displayed, in response to receiving an instruction in the second display area to update the display of the second display area.

13. An information processing method comprising:
displaying a first display area and a second display area, the second display area being an area in which a display element representing a function is disposed;
changing a setting value of the function in the second display area to a different setting value in accordance with a received instruction to change a setting in the second display area;
adding, in the first display area, a changed function image which indicates the difference from a default value changed in accordance with the received instruction in the second display area, wherein the default value is the setting value of the function which is preset in the information processing apparatus; and
while the changed function image which is added in the first display area remains to be displayed, changing the display of the second display area in which information about the function is displayed, in response to receiving an instruction in the second display area to update the display of the second display area.

14. The information processing apparatus according to claim 1,
wherein the first display area is a fixed display area, and
wherein the second display area is scrollable.

15. The information processing apparatus according to claim 1,
wherein the display is configured to simultaneously display the first display area and the second display area.

16. The information processing apparatus according to claim 1,
wherein the function is one of a copy function, a color mode function, and a scaling function.

17. The information processing apparatus according to claim 1,
wherein the function is one of a punching function, and a stapling function.

18. The information processing apparatus according to claim 1,
wherein the information processing apparatus is a multifunction printer, and
wherein the function is a function configured to be performed by the multifunction printer.

19. The non-transitory computer readable medium according to claim 12,
wherein the first display area is a fixed display area, and
wherein the second display area is scrollable.

20. The information processing method according to claim 13,
wherein the first display area is a fixed display area, and
wherein the second display area is scrollable.

21. The information processing apparatus according to claim 1, wherein the changed function image is an icon.

* * * * *